(12) United States Patent
Peng

(10) Patent No.: US 8,727,295 B2
(45) Date of Patent: May 20, 2014

(54) STAND FOR TABLET PERSONAL COMPUTER

(75) Inventor: Quanqi Peng, Liyang Town (CN)

(73) Assignee: Ningbo Cooskin Stationery Co., Ltd., Liyang Town (CN)

( * ) Notice: Subject to any disclaimer, the term of this patent is extended or adjusted under 35 U.S.C. 154(b) by 0 days.

(21) Appl. No.: 13/638,245

(22) PCT Filed: Mar. 31, 2012

(86) PCT No.: PCT/CN2012/000413
§ 371 (c)(1),
(2), (4) Date: Sep. 28, 2012

(87) PCT Pub. No.: WO2012/136076
PCT Pub. Date: Oct. 11, 2012

(65) Prior Publication Data
US 2013/0068917 A1    Mar. 21, 2013

(30) Foreign Application Priority Data
Apr. 7, 2011  (CN) .......................... 2011 2 0101632

(51) Int. Cl.
*A47B 91/00*  (2006.01)
*A47G 29/00*  (2006.01)
*B65D 19/00*  (2006.01)

(52) U.S. Cl.
USPC .............. 248/346.06; 248/346.01; 248/346.5; 248/346.3; 248/371

(58) Field of Classification Search
USPC ......... 248/346.03, 346.3, 370, 371, 397, 461, 248/346.01, 346.06, 346.5, 444, 139; 211/26, 26.1, 26.2; 108/6
See application file for complete search history.

(56) References Cited

U.S. PATENT DOCUMENTS

| | | | | |
|---|---|---|---|---|
| 2,732,828 A * | 1/1956 | Postel | ............................ | 248/461 |
| 5,290,003 A * | 3/1994 | Reyes | ............................ | 248/461 |
| 6,249,431 B1 * | 6/2001 | Chan | ........................ | 361/679.27 |
| 6,776,385 B1 * | 8/2004 | Chang | ............................ | 248/448 |
| 7,042,713 B2 * | 5/2006 | Nicolosi | .................. | 361/679.44 |
| 7,516,933 B2 * | 4/2009 | Moon et al. | ................ | 248/441.1 |
| 8,186,639 B2 * | 5/2012 | Wang | ............................ | 248/371 |
| 8,387,938 B2 * | 3/2013 | Lin | ............................ | 248/456 |
| 8,474,775 B2 * | 7/2013 | Fan | ............................ | 248/349.1 |
| 8,540,202 B2 * | 9/2013 | Hu et al. | ........................ | 248/371 |
| 2010/0315041 A1 * | 12/2010 | Tan | ............................ | 320/115 |
| 2012/0074286 A1 * | 3/2012 | Chou | ........................ | 248/346.03 |

* cited by examiner

*Primary Examiner* — Terrell McKinnon
*Assistant Examiner* — Michael McDuffie
(74) *Attorney, Agent, or Firm* — Wang Law Firm, Inc.; Li K. Wang; Stephen Hsu

(57) ABSTRACT

The invention relates to a stand for tablet PC, comprising a base with a top surface and a bottom surface; a groove located on the top surface of the base for holding a tablet PC, the groove having an inclined back side wall, wherein the tablet PC tilts backward when placed in the groove. As the base has a groove which has a inclined, and the bottom of the tablet PC can be inserted into the groove, so that the tablet PC can maintain at a relative tilted position with respect to the horizontal plane, then the user may comfortably watch the screen of the tablet PC. In short, the stand has the advantages of a simple structure, small size, low cost, convenient carrying.

12 Claims, 3 Drawing Sheets

STAND FOR TABLET PERSONAL COMPUTER

CROSS REFERENCE TO RELATED APPLICATION

This application is a national phase application of and claims the benefit of PCT Application No. PCT/Cn2012/000413, filed on Mar. 31, 2012, which claims the benefit of Chinese Patent Application No. 201120101632.9, filed on Apr. 7, 2011.

FIELD OF THE INVENTION

The present invention relates to a kind of computer accessory, in particular to a stand for a tablet personal computer (hereinafter tablet PC).

DESCRIPTION OF THE PRIOR ART

With the development of science and technology, the computer is growing popularly and gradually tends to be small, refinement, which develop from desktop computers, to notebook computers, and then to the tablet PC. The tablet PC has a small size, light weight and fashionable appearance, and is easy to carry. When used, the tablet PC is often held in hands or flatly put on a table. However, when people want to browse the information on the screen, it is better to put the tablet PC on a supporting stand, so that the tablet PC can face to the users slantways for the convenience of reading.

For this purpose, a special stand for tablet PC was invented, for example, a Chinese patent CN201568693U (Patent Number: ZL200920278858.9), titled 'A Stand for Tablet Personal Computer', disclosed a stand which is arranged in a junction structure between a foot stand and a board for holding the tablet PC, and a group of the automatic closing mechanism is provided on a shaft, comprising: a board for holding the tablet PC; a foot stand which can horizontally be closed at the back of the board or rotate oppositely to the board for an opening angle; and a pair of hinges, which are arranged respectively between the two ends of the foot stand and the back of the board; a torsion means arranged next to a second side of the stator; an automatic closing cam, with a non-round hole in the center for the traverse of the shaft for together rotation, which is provided with at least a first lug and a second lug on the adjacent surface, corresponding to a first recess and a second recess, that can fall into the first recess and the second recess so as to reach automatic closing; a fixing means which is fixed on the end of the shaft. Accordingly, when the foot stand is taken back to the parallel, the speed of the foot stand can be slowed down for avoiding the injury of pressing on the users.

Although the stand facilitates a convenient reading on the tablet PC, the structure of the stand is too complex with high cost, large volume and inconvenient use and carrying.

SUMMARY OF THE INVENTION

It is an object of the present invention to provide, based on the prior art, a stand for tablet PC with a simple structure and small size, which is convenient for use and carrying.

For achieving this object, the stand for tablet PC, comprises a base with a top surface and a bottom surface, and a groove which has an inclined back side wall located on the top surface of the base for holding a tablet PC, wherein the tablet PC tilts backward when placed in the groove. So that the tablet PC placed in the groove can face to the users slantways.

As a preference, the groove has an arc-shaped interior surface, so as to lead to an increase of the contact surface between the tablet PC placed in the groove and the groove with the friction increased.

As a preference, the groove receives a supporting pad made from rubber. The supporting pad is to prevent the base from scratching the tablet PC, and to protect the tablet PC.

As a preference, a supporting plate rotatably connected to the bottom face of the base, the supporting plate can rotate relative to the base and can be positioned outwardly away from the base. The supporting plate can rotate outwards being open, not only to support, but also to adjust the angle, so that the tablet PC can face to users in a more suitable angle and be used in a more satisfactory way. In addition, owing to the support of the supporting plate, the whole upper surface of the base is inclined relative to the horizontal plane, the bottom of the tablet PC can also directly be placed on the surface of the base, while the bottom edge of the tablet PC can rest on the table. That is, the tablet PC can face to the users in a small acute angle between the tablet PC and the horizontal plane, so as to allow the users to watch the screen from another angle, and to broaden the angle range of placing of the tablet PC.

As a preference, a recess which is adapted to the supporting plate is located on the bottom surface of the base, the supporting plate is rotatably connected to the base through a shaft; when the supporting plate rotates outwardly away from the recess, an external surface of the supporting plate rests against an internal wall of the recess, when the supporting plate rotates inwardly toward the recess, the supporting plate rests inside the recess. Therefore, when the supporting plate rotates inwardly, the supporting plate rests inside the recess with no exposure to reduce the storage space.

In order to make the supporting plate can be inversed outwards easily, a notch on the top surface of the base and adjacent to the recess. The supporting plate can be easily inversed outwards when stretching a hand into the notch during using.

As a preference, an anti-skidding cover made from soft materials is attached to the supporting plate, and an anti-skidding strip made from soft materials is attached to the bottom surface of the base. The anti-skidding cover and anti-skidding strip play a role of anti-skidding, so that the whole stand can be placed on the table more stably to prevent the stand from being pushed easily and the tablet PC from falling down and being broken.

Compared with the prior art, in the present invention, a groove is provided on the stand, which has an inclined back side wall, and the bottom of the tablet PC can be inserted into the groove, so that the tablet PC can maintain at a relative tilted position with respect to the horizontal plane, then the user may comfortably watch the screen of the tablet PC. In short, the stand has the advantages of a simple structure, small size, low cost, convenient carrying.

DETAILED DESCRIPTION OF THE PREFERRED EMBODIMENT

Figure 1:
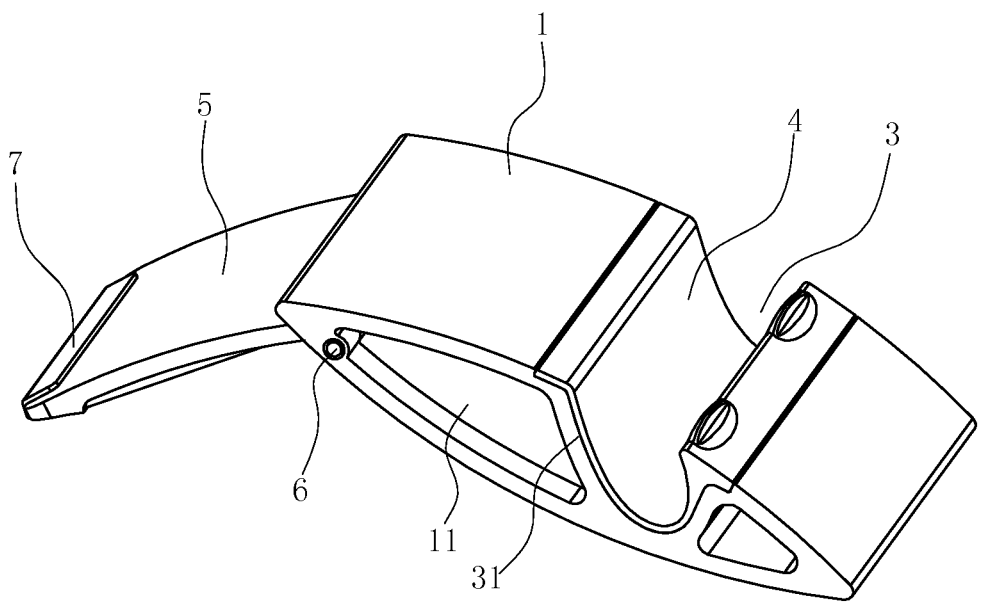
FIG. 1 is a perspective view from the front side of a stand in accordance with the embodiment of the present invention when the supporting plate is open.
Figure 2:
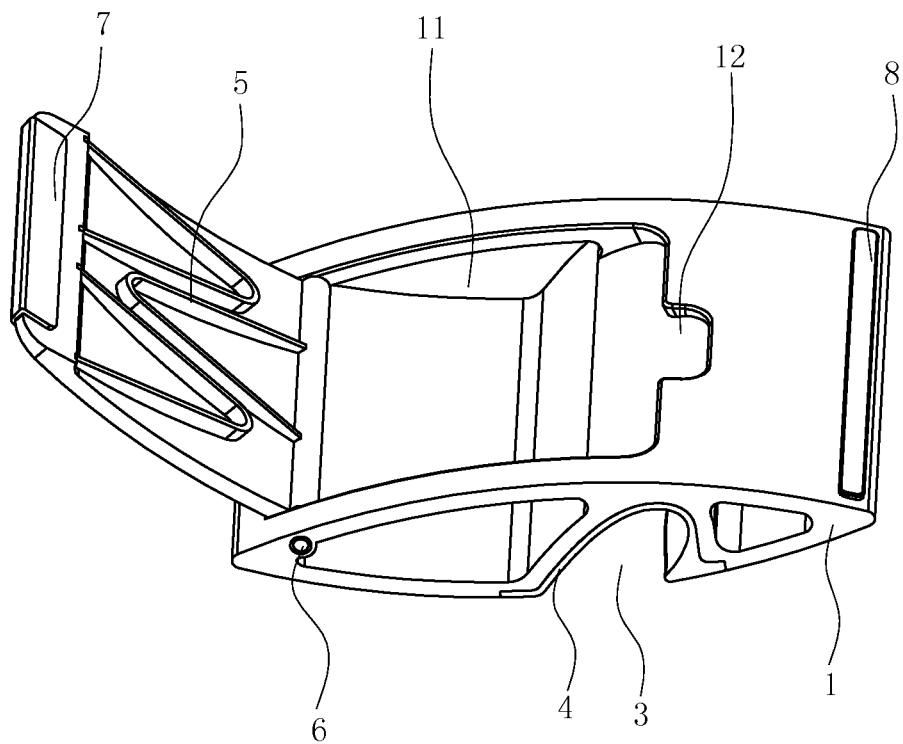
FIG. 2 is another perspective view from the back side of the stand in accordance with the embodiment of the present invention when the supporting plate is open.
Figure 3:
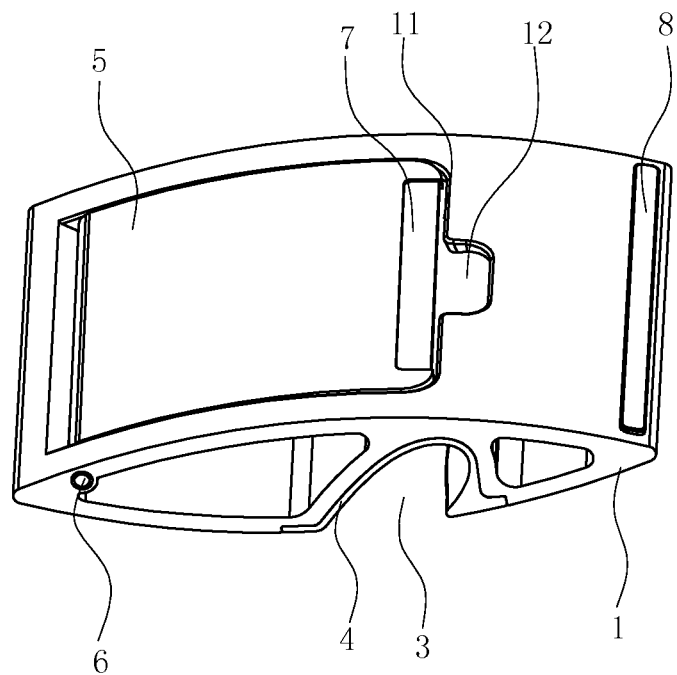
FIG. 3 is a perspective view from the back side of the stand in accordance with the embodiment of the present invention when the supporting plate is closed.
Figure 4:
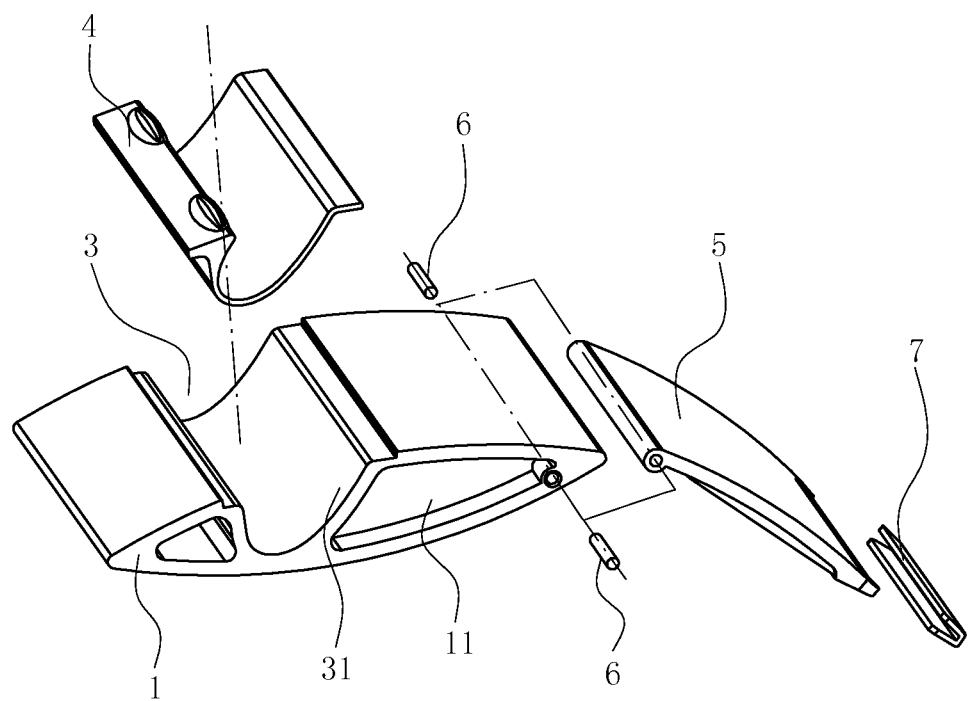
FIG. 4 is an exploded view of the stand in accordance with the embodiment of the present invention.

To enable a further understanding of the innovative and technological content of the invention herein, refer to the detailed description of the invention and the accompanying drawings below:

FIG. 1~FIG. 6 show a preferred embodiment of the present invention.

A stand for tablet PC comprises a base 1 which is made through injection molding. A groove 3 is located on the top surface of the base 1 for holding a tablet PC 2, and the groove 3 goes throughout the base 1. The interior surface of the groove 3 is in arc-shape, and the groove 3 has an inclined back side wall 31, that is, the back side wall 31 forms an acute angle with the horizontal plane, so that the tablet PC 2 placed in the groove 3 can face to the users slantways. The internal surface of the groove 3 also receives a supporting pad 4 made from rubber which is stuck with the internal surface of the groove 3.

A supporting plate 5 is rotatably connected to the bottom of the base 1, the supporting plate 5 can rotate relatively to the base 1 and can be positioned outwardly away from the base 1. The supporting plate 5 is connected to the base 1 with the following structure: a recess 11 which is adapted to the supporting plate 5 is located on the bottom surface of the base 1, and the supporting plate 5 is rotatably connected to the base through a shaft 6; a notch 12 on the top surface of the base 1 and adjacent to the recess 11 is arranged to pull the supporting plate 5 outwards conveniently; when the supporting plate 5 rotates outwardly away from the recess 11, an external surface of the supporting plate 5 rests against an internal wall of the recess 11, when the supporting plate 5 rotates inwardly toward the recess 11, the supporting plate 5 rests inside the recess 11.

An anti-skidding cover 7 made from soft materials is attached to the supporting plate 5, and the anti-skidding cover 7 is in U-shape. An anti-skidding strip 8 made from soft materials is attached to the bottom surface of the base 1.

There are two ways for using the stand.

Figure 5:
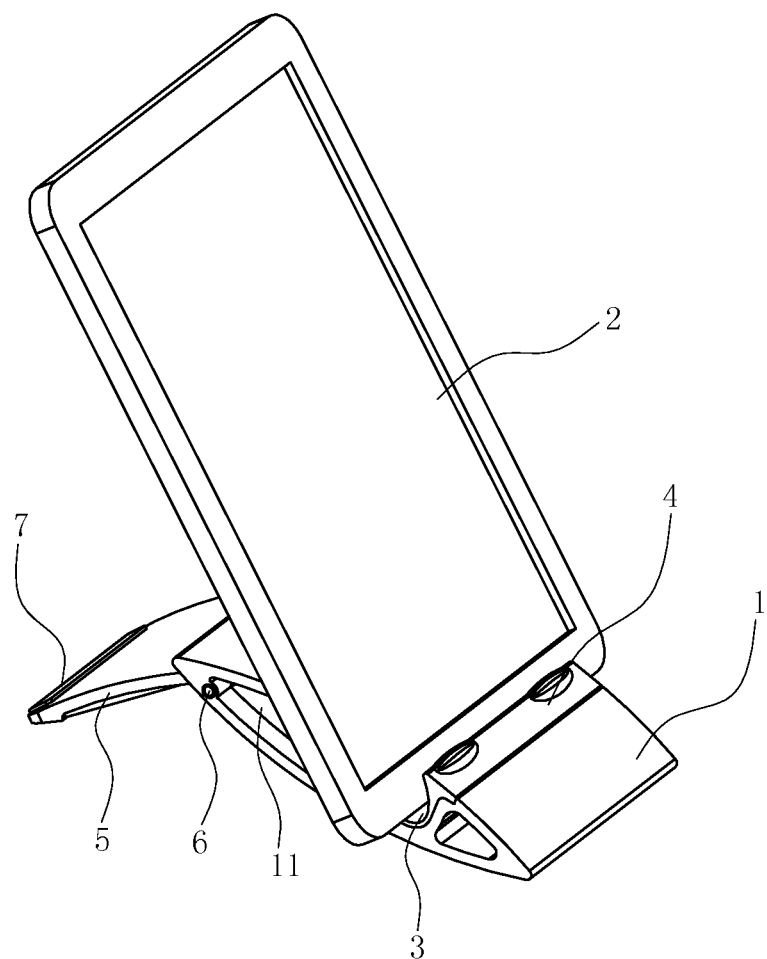
FIG. 5 is a perspective view of the stand in a first usage state in accordance with the embodiment of the present invention.

The first way: Turn outwards and open the supporting plate 5, make the supporting plate 5 and the base 1 rest on the table, then insert the tablet PC 2 into the groove 3, as shown in FIG. 5.

Figure 6:
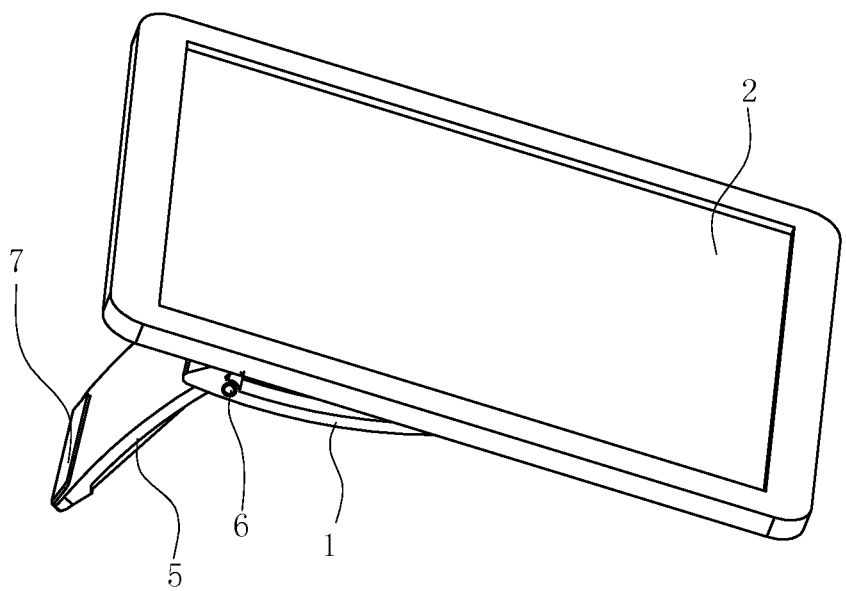
FIG. 6 is a perspective view of the stand in a second usage state in accordance with the embodiment of the present invention.

The second way: Turn outwards and open the supporting plate 5, make the supporting plate 5 and the base 1 rest on the table to make the whole upper surface of the base 1 incline relative to the horizontal plane, then directly place the bottom surface of the tablet PC 2 on the surface of the base, while the bottom edge of the tablet PC 2 rests on the table, as shown in FIG. 6.

The invention claimed is:

1. A stand for a tablet PC, comprising:
   a base with a top surface and a bottom surface, the bottom surface having a notch;
   a groove with an inclined back side wall located on the top surface of the base for holding a tablet PC;
   a recess with an internal wall located on the bottom surface of the base; and
   a supporting plate with an supporting edge and an external surface rotatably connected to the bottom surface of the base through a shaft, the supporting plate being capable of rotating relative to the base and being positioned outwardly away from the base, the supporting edge being at an opposite end from the shaft;
   wherein the tablet PC is supported by the stand when placed in the groove with the table PC resting against the inclined back wall of the groove when both the base and the supporting plate rest on a surface,
   when the supporting plate rotates outwardly away from the recess, the external surface of the supporting plate rests against the internal wall of the recess, and
   when the supporting plate rotates inwardly toward the recess, the supporting plate rests by itself inside the recess and is lifted out of the recess through the notch.

2. The stand for tablet PC of claim 1, wherein the groove further has an arc-shaped interior surface.

3. The stand for tablet PC of claim 1, wherein the groove further removably receives a supporting pad made from rubber.

4. The stand for tablet PC of claim 1, wherein the notch is connected to the recess.

5. The stand for tablet PC of claim 2, wherein the notch is connected to the recess for pulling the supporting plate outwardly.

6. The stand for tablet PC of claim 1, further comprising an anti-skidding cover, made from soft material, removably attached to the supporting edge, and an anti-skidding strip, made from soft material, attached to the bottom surface of the base.

7. The stand for tablet PC of claim 2, further comprising an anti-skidding cover, made from soft material, removably attached to the supporting edge, and an anti-skidding strip, made from soft material, attached to the bottom surface of the base.

8. The stand for tablet PC of claim 3, further comprising an anti-skidding cover, made from soft material, removably attached to the supporting edge, and an anti-skidding strip, made from soft material, attached to the bottom surface of the base.

9. The stand for tablet PC of claim 1, wherein, when the tablet PC is supported by the stand, only the supporting edge of the supporting plate and the base rest on the surface.

10. A stand for a tablet computing device, comprising:
    a base with a top surface and a bottom surface, the bottom surface having a recess and a notch connected to the recess, the top surface having a groove; and
    a supporting plate rotatably attached to the base through a shaft, the supporting plate having a supporting edge and the supporting plate being able to fit inside the recess,
    wherein the tablet computing device is placed in the groove when the supporting plate is lifted out of the recess through the notch and the supporting plate rests on a surface by having only the supporting edge in contact with the surface.

11. The stand for a tablet computing device, wherein the supporting plate being the only element rotatably mounted on the shaft.

12. The stand for a tablet computing device, wherein the base further has a first lateral side and a second lateral side, a through passage is formed between the first lateral side and the second lateral side when the supporting plate is inside the recess.

* * * * *